Patented Nov. 5, 1935

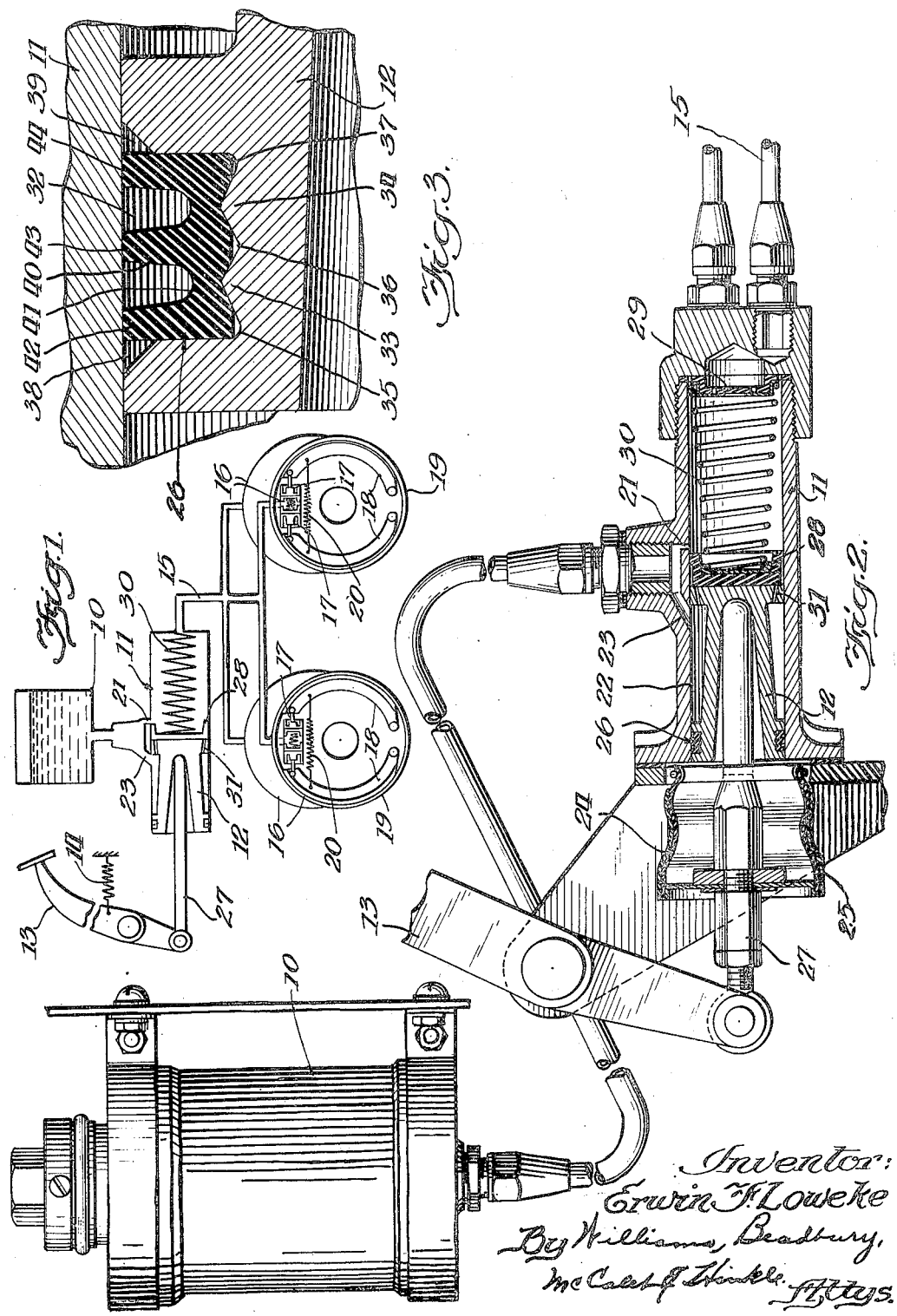

2,019,757

UNITED STATES PATENT OFFICE 2,019,757

SEALING MEANS

Erwin F. Loweke, Detroit, Mich., assignor to Hydraulic Brake Company, Detroit, Mich., a corporation of California Application October 6, 1932, Serial No. 636,449

7 Claims. (Cl. 309—23)

My invention pertains to sealing means and is particularly concerned with sealing means adapted for or applicable to the master cylinders of hydraulic brake systems or other fluid pressure systems.

Hydraulic brake systems of the type now in use on automotive vehicles comprise a fluid reservoir, a compression cylinder commonly known as a master cylinder, fluid lines leading from the master cylinder to the wheels, and brake actuating cylinders at the wheels commonly referred to as wheel cylinders.

In one form of master cylinder the rear end of the cylinder is exposed to the atmosphere, and sealing means must be provided to prevent leakage of fluid from this exposed end of the cylinder and leakage of air into the system through this exposed end.

An object of my invention is to provide a sealing means particularly adapted for this purpose and which will function more efficiently than those now in use.

Another object is to provide an improved sealing means which will provide for wear and will retain its full effectiveness over a long period of use.

Another object is to provide a sealing means which does not produce undue friction between the relatively moving parts and which therefore does not interfere with the ease of operation necessary in a device of this type.

Other objects and advantages will become apparent as the description proceeds.

In the drawing,

Fig. 1 is a diagrammatic illustration of a hydraulic brake system incorporating my invention;

Fig. 2 is a view of the reservoir and master cylinder of the system shown in Fig. 1; and Fig. 3 is an enlarged cross-sectional view of my improved sealing means.

Referring to the drawing, I have shown the hydraulic brake system as comprising a reservoir 10 connected to a master cylinder 11 having a piston 12 operated by a foot brake pedal 13 which is normally held in retracted position by a spring 14. The discharge end of the cylinder 11 connects with a fluid conduit system 15 leading to the wheel cylinders 16 which are provided with opposed pistons 17 for actuating the brake shoes 18 and moving them into contact with the brake drum 19. The brake shoes are normally held in off position by a retractile spring 20.

Referring to Fig. 2, it will be seen that when the parts of the brake system are in their normal or rest position, the reservoir 10 is in free communication with the right-hand end of the cylinder 11 by means of a port 21, and this reservoir also communicates by a second port 23 with a recess 22 formed in the piston 12.

The rear or left-hand end of the cylinder 11 is protected by a flexible boot 24 which serves to exclude dust and moisture from this end of the cylinder. This boot, however, is not relied upon as a fluid seal to prevent escape of fluid from the cylinder and, in fact, is provided with a small opening or breather hole 25 which maintains the interior of the boot in direct communication with atmosphere. It is therefore necessary to provide a fluid-tight seal between the rear end of the piston and the wall of the cylinder in order to prevent escape of fluid from the annular recess 22, and for this purpose I provide the sealing means indicated at 26 which I will describe more fully hereinafter.

In the operation of the brake system shown in the drawing, the operator places his foot upon pedal 13 and depresses this pedal, thereby advancing piston rod 27 to the right, as viewed in the drawing. The right-hand end of this piston rod contacts with the base of a socket formed in the piston 12 and advances this piston toward the right. The initial movement of this piston causes the rubber cup 28 to close the port 21, thereby cutting off communication between the right-hand or compression end of the cylinder 11 and the reservoir. The advancing movement of the piston 12 forces fluid past the valve 29 and into the conduit system 15, with the result that the wheel cylinder pistons 17 are separated and force the brake shoes 18 into engagement with the brake drums 19. The two-way valve 29 is described and claimed in my application for United States Letters Patent, Serial No. 337,122, filed February 2, 1929, and need not be further described herein.

After the desired braking effect has been created, the operator releases pressure on the pedal 13 which is immediately returned to initial position by spring 14. This return of the pedal 13 is entirely independent of the piston 12 since the piston rod 27 merely rests in the depression formed in the piston 12 and is entirely free to separate therefrom during the return movement of the brake pedal.

The piston 12 and cup washer 28 are returned by spring 30 which also acts on the valve 29 to restrict the return of fluid from the wheel cylinders 16 wherein the pistons 17 are moved inwardly by springs 20, thereby forcing fluid back into the conduit system and thence past valve 29 and into the master cylinder. The design of the brake system is such that the spring 30 returns the piston 12 faster than fluid is returned to the master cylinder by the wheel cylinder pistons, thereby creating a partial vacuum in that part of the master cylinder to the right of the piston. This results in sucking fluid through openings 31 and past cup washer 28, and it is during this return movement of the piston that the sealing means 26 must function effectively to prevent any air being sucked past the rear end of the piston 12. After the piston 12 has reached its fully retracted position, the right-hand end of the master cylinder is in free communication with the reservoir by way of port 21, and any excess fluid which may have been drawn past the cup washer 28 during the return stroke of the piston will be returned to the fluid reservoir as the wheel cylinder pistons complete their retractile movements.

The particular sealing means which forms the subject-matter of my invention is shown most clearly in Fig. 3. Referring to that figure, it will be seen that I provide an annular groove 32 having a serrated bottom providing two annular projections 33 and 34, which are conical in cross-section, and three annular recesses 35, 36 and 37. Where the groove merges with the outer periphery of the piston the groove is widened out, as indicated at 38 and 39.

In the groove I locate a flexible sealing ring 40 of rubber or other suitable material, having a base 41 and three spaced ribs 42, 43 and 44. The diameter of the inner periphery of the base 41 of the sealing ring is about half way between the maximum diameter of the projections and the minimum diameter of the recesses. The projections occur opposite the spaces between the ribs, and these projections act to spread the ribs and force them against the side walls of the groove. The projections distort the base of the sealing ring, causing it to bulge into the recesses and also force the ends of the ribs against the cylinder wall. The sealing ring is thus placed under sufficient initial distortion to compensate for any wear which may occur on the ends of the ribs and also for any decrease in resiliency which may take place during the normal life of the apparatus.

While I have illustrated and described only one form of my invention, it is to be understood that my invention is capable of assuming numerous forms, and that the scope of my invention is limited only by the following claims.

I claim:

1. In mechanism of the class described, the combination of a first member having a cylindrical surface, a second member reciprocably mounted in engagement with said surface, said second member having an annular recess formed therein, said recess providing a surface opposite said cylindrical surface consisting of alternate annular projections and depressions, and a flexible ring in said recess having a surface engaging said cylindrical surface and a base spaced from said annular depressions but engaging said annular projections, whereby said ring is pressed against said cylindrical surface.

2. In mechanism of the class described, the combination of a cylinder, a piston reciprocable therein and having an annular recess, said recess including a bottom having alternate annular projections and depressions, and a flexible rubber ring having an internal diameter normally less than the maximum diameter of said annular projections, said ring being positioned about said projections in said recess whereby said ring is expanded and is pressed against the inner wall of said cylinder.

3. In mechanism of the class described, the combination of a cylinder, a piston reciprocable therein and having an annular recess providing a bottom having alternate annular projections and depressions, said recess also providing side walls having their outer portions flaring in opposite directions longitudinally of said piston, and an elastic ring having its internal diameter normally less than the maximum diameter of said annular projections and having spaced ribs at its periphery, said ring being positioned about said projections in said recess whereby said ring is expanded and said spaced ribs are pressed against the inner wall of said cylinder.

4. In mechanism of the class described, the combination of a cylinder, a piston reciprocable therein and having an annular recess, an expansible ring of substantially the same width as said recess having a plurality of alternate annular ribs and depressions, and annular means in said recess having a diameter greater than the normal diameter of said ring and engaging in said ring at points between successive ribs thereon for deforming said ring, whereby said annular ribs are pressed against the inner wall of said cylinder and the outer of said ribs are pressed against the walls of said recess.

5. In mechanism of the class described, the combination of a cylinder, a piston reciprocable therein and having an annular recess, an expansible ring of substantially the same width as said recess having a plurality of alternate annular ribs and depressions, and a plurality of annular members in said recess having a diameter greater than the normal internal diameter of said ring and arranged in staggered relationship with said ribs whereby said ring is expanded and said ribs are pressed against the inner wall of said cylinder.

6. In combination, a rubber element for sealing adjacent and relatively movable members, one of which has a recess, said rubber element being positioned in said recess and having a base with a side thereof adapted to face the bottom of said recess, and a plurality of spaced projections extending from the other side of said base for engagement with the other said relatively movable member, said rubber element being capable of deformation in a direction normal to said base and in a direction laterally of said base, and spaced members between said base and the bottom of said recess, said spaced members being staggered with respect to said projections and engaging said base whereby said spaced members deform said element to force the same outwardly against one of said relatively movable members and cause some of said projections to engage the side walls of said recess.

7. In combination, an elastic ring for sealing the space about a piston reciprocable in a cylinder and having an annular recess, said ring having spaced annular projections engageable with the inner wall of said cylinder and being capable of deformation axially and radially of said piston, and ring deforming members having a greater diameter than the normal diameter of said elastic ring and positionable in said recess, said ring deforming members being staggered in respect to said projections and engaging said ring whereby it is deformed and said projections are pressed against the inner wall of said cylinder and against the sides of said recess.

ERWIN F. LOWEKE.